United States Patent [19]

Blizzard et al.

[11] Patent Number: 5,037,886
[45] Date of Patent: Aug. 6, 1991

[54] CROSSLINKABLE PRESSURE-SENSITIVE ADHESIVES CONTAINING A LIQUID COPOLYMERIC ORGANOPOLYSILOXANE

[75] Inventors: John D. Blizzard, Bay City; Terence J. Swihart, Essexville, both of Mich.

[73] Assignee: Dow Corning Corporation, Midland, Mich.

[21] Appl. No.: 181,763

[22] Filed: Apr. 14, 1988

Related U.S. Application Data

[63] Continuation-in-part of Ser. No. 148,319, Jan. 25, 1988, abandoned.

[51] Int. Cl.$^5$ ............................................. C08L 83/06
[52] U.S. Cl. ..................................... 525/105; 525/100; 525/104; 525/106; 525/453; 525/477; 156/310; 156/327; 156/329; 427/387; 428/420
[58] Field of Search .............. 525/100, 104, 105, 106, 525/453, 477; 156/310, 329, 327; 428/420; 427/387

[56] References Cited

U.S. PATENT DOCUMENTS

| | | | |
|---|---|---|---|
| 3,644,245 | 2/1972 | Flanagan et al. | 260/23 |
| 3,657,379 | 4/1972 | Hibelink et al. | 260/824 |
| 3,707,518 | 7/1968 | Bemmels et al. | 260/29.6 |
| 4,126,504 | 11/1978 | Wolinski et al. | 156/310 |
| 4,151,319 | 4/1979 | Sackoff et al. | 428/40 |
| 4,310,678 | 1/1982 | Blizzard et al. | 556/451 |
| 4,322,518 | 3/1982 | Blizzard | 528/15 |
| 4,423,095 | 12/1983 | Blizzard | 427/387 |
| 4,463,115 | 7/1984 | Hirose et al. | 524/188 |
| 4,500,584 | 2/1985 | Modic | 428/145 |
| 4,581,281 | 4/1986 | Gerace | 428/215 |
| 4,593,068 | 6/1986 | Hirose et al. | 525/100 |
| 4,665,127 | 5/1987 | Hirose et al. | 525/100 |
| 4,693,935 | 9/1987 | Mazurek | 428/352 |

FOREIGN PATENT DOCUMENTS 59-145269 8/1984 Japan ................................. 525/100

OTHER PUBLICATIONS

PCT WO 87/03477; 6-18-87.

Primary Examiner—Melvyn I. Marquis
Assistant Examiner—Ralph H. Dean, Jr.
Attorney, Agent, or Firm—Alexander Weitz

[57] ABSTRACT

The invention relates to a method of contacting two components to form a pressure-sensitive adhesive (PSA) construction, wherein the first component comprises a conventional PSA and a liquid copolymeric organopolysiloxane and the second component comprises the PSA and a cure agent for the liquid copolymeric organopolysiloxane. The method provides improved adhesion over the unmodified PSA as measured by bond strength and/or the percentage of cohesive failure of the construction, which bond strength generally increases with the passage of time.

33 Claims, No Drawings

CROSSLINKABLE PRESSURE-SENSITIVE ADHESIVES CONTAINING A LIQUID COPOLYMERIC ORGANOPOLYSILOXANE

This is a continuation-in-part application of application Ser. No. 148,319, filed on Jan. 25, 1988, now abandoned.

The present invention relates to crosslinkable pressure-sensitive adhesives and an improved method for forming a pressure-sensitive adhesive construction. More particularly, the present invention relates to a method of contacting two distinct components to form the pressure-sensitive adhesive construction, wherein a liquid copolymeric organopolysiloxane is incorporated in the first component and a cure agent for the liquid copolymeric organopolysiloxane is incorporated in the second component.

BACKGROUND OF THE INVENTION

It is well known in the adhesives art that significant improvement in adhesion to various substrates can be obtained by incorporating various adhesion promoters into adhesive compositions for coating the substrate. Development of a wide-ranging adhesives art has benefited from this method of adhesion improvement and various organosilanes have been typically employed as the adhesion promoter.

Organosilanes which are useful in these applications generally contain hydrolyzable groups (e.g., halogen, alkoxy) attached to the silicon atom thereof which generate silanol groups upon contact with ambient moisture, and thus readily form chemical and/or physical bonds with mineral and metal surfaces. Also attached to the silicon of the organosilane adhesion promoter is an organic moiety which is reactive with, or at least shows some affinity towards, one of the components of the adhesive (usually the polymer). This latter requirement usually limits the practical utility of a specific organosilane to particular adhesive-substrate combinations. In this way, a chemical or physical "molecular bridge" is believed to be formed between the adhesive and the substrate which results in the observed macroscopic improvement in adhesion.

Thus, for example, U.S. Pat. No. 3,644,245 to Flanagan et al. discloses hot melt adhesive compositions having improved adhesion under conditions of high humidity. These compositions comprise a synthetic polymer base and hydrolyzable silanes containing such organic groups as phenyl, vinyl, epoxy, mercapto, amino, ethyl, methyl and methacryloxypropyl.

Additionally, the adhesion to a substrate, as well as the cohesive strength of an adhesive composition, may be augmented by at least partially cross-linking the adhesive. Various examples of this method exist in the art, which method is illustrated by U.S. Pat. No. 3.657.379 to Hilbelink et al. This disclosure teaches adhesive systems comprising separated reactive components wherein (1) a first reactive polymer is mixed with a curing agent for a second reactive polymer to yield one component and (2) a second reactive polymer is mixed with a curing agent for the first reactive polymer to form another component. When the reactive materials from the two components are mixed, the curing agents react with their respective reactive polymers to give strong adhesive bonds.

A distinct category of adhesives which generally comprises natural or synthetic rubbers and resin tackifiers is known in the art as "pressure-sensitive adhesives" (PSAs). PSAs uniquely maintain a permanent "tack" which provides a bond of measurable strength immediately upon contact with another surface. Again, adhesion to a substrate, as well as the cohesive strength of the PSA composition itself, can be improved by curing the PSA.

A cured PSA based on a polyether having at least one silicon-containing hydrolyzable group in its molecule is disclosed by Hirose et al. in U.S. Pat. No. 4,463,115. This composition also contains a tackifier and, optionally a silanol condensation catalyst for accelerating the curing reaction. It is stated that the resulting PSA has good adhesive properties and can be prepared substantially without the use of a solvent.

In a subsequent U.S. Pat. No. 4,665,127, Hirose et al. extended the above concept to include a wide variety of polymers having at least one reactive silicon-containing group combined with an organic aluminum or organic zirconium catalyst. These PSA compositions are said to have excellent heat resistance and releasability from substrates such as a silicone-coated release paper.

In U.S. Pat. No. 3,707,518, Bemmels et al. disclose a self cross-linking pressure-sensitive acrylate adhesive and tape which comprises a copolymer that includes a small amount of an alkoxy silyl polymerizable crosslinking monomer. Also included in these compositions is 2-6 parts by weight of an acid monomer which acts as a built-in catalyst and causes the adhesive copolymer to cure at ordinary temperatures.

Aside from silicone-based PSAs and the somewhat related above mentioned examples wherein silanes are used as adhesion promoters or compositions wherein reactive silicon groups are chemically attached to organic molecules to promote cure therebetween, silicones are generally known in the art to be abhesive materials (i.e., they impart good release of adhesives). Indeed, they have been widely employed in release liners for pressure-sensitive tape. Thus, for example, in U.S. Pat. No. 4,322,518, assigned to the assignee of the present invention. Blizzard discloses silicone coating compositions which comprise a curable silicone polymer fluid or gum and a liquid $SiO_2$-based resin as the sole curing agent for the fluid or gum. When cured on various substrates, these silicone compositions provide release coatings having controllable release forces for adhesives applied thereto.

SUMMARY OF THE INVENTION

It has therefore been of great surprise to now find that certain functional silicone compounds, when employed according to the methods of the present invention, can actually impart improved adhesion to a wide ranging array of pressure-sensitive adhesive constructions. Even more surprisingly, the augmented adhesion provided by the compositions of the present invention has been found to increase with time, contra the case wherein only silanes of the prior art, or cure agents alone, are incorporated in pressure-sensitive adhesive compositions. The present invention, therefore, relates to a method for forming a crosslinkable pressure-sensitive adhesive construction comprising: contacting a first component comprising (I) a pressure-sensitive adhesive; and (II) a liquid copolymeric organopolysiloxane prepared by a method comprising (i) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{\frac{1}{2}}$ units and $SiO_{4/2}$ units wherein the ratio of $R_3SiO_{\frac{1}{2}}$ units to $SiO_{4/2}$ units is 0.6:1 to 0.9:1 and each R denotes, independently, a monovalent hydrocarbon radical and (b) a liquid organohydrogenpoly-siloxane wherein each organic radical is, independently, a monovalent hydrocarbon radical, there being an average of at least one silicon-bonded hydrogen radical per molecule of said organohydrogenpolysiloxane, and (ii) heating said homogeneous mixture to remove substantially all of said organic solvent therefrom, with a second component comprising (III) said pressure-sensitive adhesive; and (IV) a cure agent for said liquid copolymeric organopolysiloxane.

This invention further relates to a composition comprising the pressure-sensitive adhesive and the liquid copolymeric organopolysiloxane employed in the above described method.

DETAILED DESCRIPTION OF THE INVENTION

In the method of the present invention, a first component comprising a pressure-sensitive adhesive (PSA) (I) and a liquid copolymeric organopolysiloxane (II) is contacted with a second component comprising the same pressure-sensitive adhesive (III) and a cure agent for the liquid copolymeric organopolysiloxane (IV) to form a PSA construction. While not wishing to be bound by any particular mechanism, it is believed that, after the PSA construction is formed, the cure agent interacts with the liquid copolymeric organopolysiloxane to provide a "permanent set" to the adhesive system. Permanent set, as used herein, refers to the irreversible increase with time of the adhesive bond between the first and second components. This interaction can, of course, be hastened at elevated temperatures. The individual components, however, may generally be stored for prolonged periods under ambient conditions as long as they are not in contact with each other.

As far as is known, the exact nature of the pressure-sensitive adhesive (I) employed in the method and composition of the present invention is not critical to operability. The only limitation to this general operability is that the PSA have a reasonable degree of compatibility with the liquid copolymeric organopolysiloxane (II) and the cure agent (IV), each described infra. By compatibility it is meant that the PSA components are not subject to phase separation upon standing and remain as homogeneous dispersions or solutions. Thus, it is believed that any of the PSAs known in the, art will function satisfactorily herein. These PSAs are generally based on a natural or synthetic rubber which has been mixed with a tackifier resin and, optionally, with various fillers, plasticizers, extender oils, catalysts, preservatives, antioxidants, stabilizers, or other ingredient normally employed in the preparation of PSAs. The PSAs suitable for use in the methods and compositions of the present invention may be based on natural rubber and/or one or more synthetic rubber such as butyl, silicone, acrylic, styrene-butadiene, acrylonitrile-butadiene, polyisobutylene, isoprene, isoprene-isobutylene, chloroprene, polyvinylether, chlorinated and polyurethane rubbers, and the like. Typical resin tackifiers used in conjunction with these rubbers include rosin, hydrocarbon resins, terpene resin, siloxane resin, and the like. Particularly preferred PSAs include those based on styrene-butadiene, silicone and acrylic polymers.

The pressure-sensitive adhesives of ingredient (I) are well known in the art and further description thereof is considered unnecessary. Many of these materials are available commercially.

The liquid copolymeric organopolysiloxane (II) of this invention may be prepared by reacting (a) a resinous copolymeric siloxane with (b) a liquid organohydrogenpolysiloxane, as taught by Blizzard et al. in U.S. Pat. No. 4,310,678, assigned to the assignee of the present invention and hereby incorporated by reference. The liquid copolymeric organopolysiloxane contains silicon-bonded hydroxyl radicals and/or silicon-bonded hydrogen radicals which provide chemical reactivity therefor in the compositions of this invention.

Ingredient (a) that is used to prepare the liquid copolymeric organopolysiloxane is an organic solvent solution of a resinous copolymeric siloxane which consists essentially of $R_3SiO_{\frac{1}{2}}$ siloxane units and $SiO_{4/2}$ siloxane units in a molar ratio which provides from 0.6 to 0.9 $R_3SiO_{\frac{1}{2}}$ units for every $SiO_{4/2}$ unit. Each R denotes a monovalent hydrocarbon radical; such as an alkyl radical, such as methyl, ethyl, isopropyl, butyl and hexyl: an alkenyl radical, such as vinyl and allyl; an aryl radical, such as phenyl, tolyl and xylyl; an arylalkyl radical, such as beta-phenylethyl and beta-phenylpropyl; and a cycloaliphatic radical, such as cyclopentyl, and cyclohexyl. Preferably all R radicals in ingredient (a) are lower alkyl radicals although a minor portion of them can be replaced with other monovalent hydrocarbon radicals such as the vinyl radical and/or the phenyl radical to provide additional properties for the resinous copolymer such as the reactivity attendant therewith. It is preferred that the resinous copolymeric siloxane portion of ingredient (a) consists essentially of $(CH_3)_3SiO_{\frac{1}{2}}$ siloxane units and $SiO_{4/2}$ siloxane units, in the molar ratio of about 0.75:1.

Resinous copolymeric siloxanes are well known in the art and are typically prepared in an organic solvent which can conveniently serve as the organic solvent portion of ingredient (a). The particular organic solvent portion of ingredient (a) is not critical and can be, for example, an aliphatic hydrocarbon, an aromatic hydrocarbon or halogenated derivatives of either, or mixtures thereof. Particularly useful organic solvents include benzene, toluene, xylene, trichloroethylene and mineral spirits.

Ingredient (b) that is used to prepare the liquid copolymeric organopolysiloxane is any liquid organohydrogenpolysiloxane containing an average of at least one silicon-bonded hydrogen atom per molecule, and can have a linear, cyclic or branched structure or combinations thereof. Thus, ingredient (b) has the unit formula $R_mH_nSiO_{(4-m-n)/2}$ wherein m and n denote positive numbers whose sum is less than 4, preferably from 1.9 to 2.1. The organic radicals R in ingredient (b) can be any of the R radicals denoted above. Preferably, although not necessarily, the organic radicals R in ingredient (b) are the same as the organic radicals R in ingredient (a).

Examples of organohydrogenpolysiloxanes that are suitable for use as ingredient (b) include cyclic organohydrogenpolysiloxanes of the unit formula $R_mH_{2-m}SiO$ such as $[(CH_3)(H)SiO]_x$ wherein x is 3, 4, 5, 6 and higher and $[(CH_3)(H)SiO]_y[(CH_3)_2SiO]_z$ wherein the sum of y plus z is 3, 4, 5, 6 and higher, and linear organohydrogenpolysiloxanes of the formula $R'R_2SiO(R_2SiO)_a(RHSiO)_bSiR_2R'$, such as $R'(CH_3)_2SiO[(CH_3)_2SiO]_a[(CH_3(H)SiO]_bSi(CH_3)_2R'$ wherein $R'$ denotes H or methyl and a and b each denote zero or a number greater than zero, provided there is at least one silicon-bonded hydrogen atom per molecule, such as $H(CH_3)_2SiO[(CH_3)_2SiO]_aSi(CH_3)_2H$, $(CH_3)_3SiO[(CH_3)(H)SiO]_bSi(CH_3)_3$, $(CH_3)_3SiO[(CH_3)(H)SiO]_b[(CH_3)_2SiO]_aSi(CH_3)_3$ and $H(CH_3)_2SiO[(CH_3)_2SiO]_a[(CH_3)(H)SiO)]_bSi(CH_3)_2H$ An organohydrogenpolysiloxane having the formula $(CH_3)_3SiO[(CH_3)(H)SiO]_bSi(CH_3)_3$, wherein b has an average value of from 30 to 70, is a highly preferred ingredient (b). It is particularly preferred that b is about 35.

On a solids basis, the organohydrogenpolysiloxane (i.e., ingredient b) content of the liquid copolymeric organopolysiloxane varies between about 10 and 90 weight percent of the reaction product. Preferably, the organohydrogenpolysiloxane content of the liquid copolymeric organopolysiloxane varies between about 40 and 60 weight percent and most preferably it is about 50 weight percent on a solids basis. Herein, the term "solids basis" denotes the non-solvent content of any composition or ingredient.

In order to prepare the liquid copolymeric organopolysiloxane, a homogeneous mixture is formed by thoroughly mixing the desired amounts of ingredient (a) and ingredient (b) and, if necessary, an acid, preferably a strong acid such as hydrochloric acid, to provide an acid number greater than zero therefor. Preferably the acid number of the homogeneous mixture, on a solids basis, has a value of from 0.1 to 1. Preferably ingredient (a) is sufficiently acidic, as prepared, to provide this acidity for the homogeneous mixture. Herein, acid number is the number of mg of potassium hydroxide required to neutralize 1 gram of sample (solids basis) using Bromocresol Purple as the acid/base indicator.

The resulting homogeneous mixture is immediately or subsequently heated to volatilize the organic solvent therefrom. Said heating is preferably initially done at atmospheric pressure and is then continued at reduced pressure to accelerate the removal of said solvent.

In a preferred embodiment of this invention the homogeneous mixture of (a) plus (b) is heated to about 150° C. at atmospheric pressure and is then subjected to a gradually decreasing pressure, without an increase in temperature, to remove substantially all of the organic solvent therefrom. By substantially it is meant herein that the liquid copolymeric organopolysiloxane contains less than about 5 percent, and preferably less than about 1 percent, by weight organic solvent.

Alternatively, the homogeneous mixture can be partially devolatilized at room temperature, such as by evaporation, and the partially devolatilized mixture then heated to remove substantially all of the organic solvent therefrom.

Further details dealing with the preparation of the liquid copolymeric organopolysiloxane, as well as descriptions of components (a) and (b), may be found in U.S. Pat. No. 4,310,678, cited supra.

Ingredient (III) of the present invention is the same PSA as ingredient (I).

The cure agent (IV) for the liquid copolymeric organopolysiloxane may be selected from any of the compounds which are known to facilitate the condensation reactions between SiOH groups and between SiOH and SiH groups. Compounds known to facilitate the reaction between SiH groups in the presence of trace quantities of water may also be used for this purpose. For example, the compounds contemplated may be metal salts of carboxylic acids. Metals such as Pb, Zn, Sb, Fe, Cd, Sn, Ba, Ca and Mn are known to be effective in this regard, particularly the naphthanates, octoates, hexoates, laurates and acetates. Preferred salts are dibutyltin diacetate, dibutyltin dilaurate and stannous octoate, particularly the dibutyltin diacetate. These catalysts, and their use in promoting the above-mentioned reactions, are well known in the art.

The cure agent may also be selected from active metal catalysts such as platinum and rhodium compounds. Platinum catalysts such as platinum acetylacetonate or chloroplatinic acid are representative of these compounds and suitable for use as the cure agent (IV). Again, such compounds, and their utility in promoting the above reactions, are well known in the art. A preferred cure agent of this type is a mixture of a chloroplatinic acid complex of divinyltetramethyldisiloxane diluted in dimethylvinylsiloxy endblocked polydimethylsiloxane which may be prepared according to methods described by Willing in U.S. Pat. No. 3,419,593. Most preferably, this mixture contains about 0.65 weight percent platinum. When the cure agent (IV) is a platinum complex, it is further preferred that this ingredient also contain a methylvinyl-functional siloxane, such as methylvinylcyclosiloxane or a dimethylmethylvinyl polysiloxane copolymer, having at least two vinyl groups per molecule.

Cure agent (IV) can also comprise an aminofunctional silane having the general formula

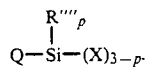

wherein Q is the group

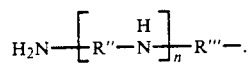

In the above formulas, R" represents a divalent hydrocarbon radical having 2 to 4 carbon atoms such as ethylene, trimethylene and tetramethylene. R'" is a divalent hydrocarbon radical having 3 to 6 carbon atoms, including such groups as trimethylene, tetramethylene, methyltrimethylene, pentamethylene and hexamethylene. The organic group R"" may be selected from the group consisting of the methyl, ethyl, propyl, butyl and phenyl radicals. The hydrolyzable species X may be selected from methoxy, ethoxy, acetoxy or chlorine groups. Finally, n is an integer between zero and two, inclusive, and p is zero or one. Preferred aminofunctional silanes are N-gamma-aminopropyltriethoxysilane, N-beta-aminoethyl-gamma-amino-isobutyltrimethoxysilane and N-beta-aminoethyl-gamma-aminopropyltrimethoxysilane, the latter being most preferred. These aminofunctional silanes may be combined with up to about 90 weight percent of organosilanes having the general formula

wherein R and X have the above defined meanings. Preferred R groups are selected from methyl, ethyl or phenyl radicals and preferred X groups are methoxy groups. Thus, an example of such a combination is a mixture consisting of 10% by weight of N-beta-aminoethyl-gamma-aminopropyltrimethoxysilane and 90% by weight of phenyltrimethoxysilane. When these cure agents bearing the hydrolyzable group X are employed in the second component of the present invention, this component must be stored in a dry environment until it is used. In use, the X group is hydrolyzed by ambient moisture.

Amine-functional silicones may also be employed as the cure agent and have the average general formula

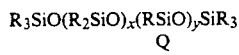

wherein R and Q have their previously defined meanings, x is about 50 to 450 and y is 1 to about 50. It is preferred that all the R groups be methyl. An example of such a preferred amine-functional silicone is represented by the formula

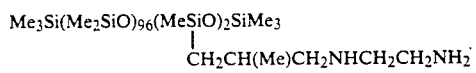

wherein Me denotes a methyl radical.

Cure agent (IV) may also be selected from primary, secondary or tertiary organic amines. Preferred amines are alkyl or aryl amines wherein the alkyl groups contain from 1 to 6 carbon atoms and wherein the aryl group is a phenyl radical. Specific examples of amines useful in the present invention are ethylamine, methylamine, phenylamine, diethylamine, dimethylamine, dibutylamine, diphenylethylamine, phenylmethylamine, butylamine, triethylamine, trimethylamine and tripropylamine. For the purposes of the present invention, diethylamine, triethylamine, and diethylenetriamine are most preferred.

The amine-functional silanes and siloxanes, as well as the organic amines, are all well known in the art and further descriptions thereof are considered unnecessary.

The compositions of this invention can further comprise typical adjuvants employed in the preparation of pressure sensitive adhesives such as catalysts, fillers, pigments, dyes, fungicides, bacteriocides, stabilizers, antioxidants and cure-control additives, if desired.

In order to practice the present invention, the first component of this invention is prepared by thoroughly mixing, on a solids basis, from about 1 to 50 parts by weight, preferably from 3 to 10 parts, of the liquid copolymeric organopolysiloxane (II) with 100 parts of the PSA. The compositions of the present invention, in which the liquid copolymeric organopolysiloxane (II) is incorporated in a PSA (I), are thus employed as an intermediate in the method of the invention. In a similar manner, the second component of this invention is prepared by thoroughly mixing a curing amount of the cure agent (IV) with 100 parts of the PSA (III). By "curing amount" it is meant at least an amount sufficient to improve the adhesion between the two components as demonstrated by an increase in bond strength and/or increased cohesive failure versus the unmodified PSA. Thus, the amount of cure agent employed will vary according to the nature of the PSA, amount of the liquid copolymeric organopolysiloxane incorporated therein and the particular cure agent selected. Those skilled in the art will readily arrive at optimum formulations by routine experimentation. For example, when the PSA is selected from the preferred systems based on styrene-butadiene, acrylic or silicone rubber, from about 0.01 to 50 parts by weight of the preferred cure agent dibutyltin diacetate are effectively employed per 100 parts by weight of the PSA, from about 3 to 10 parts of dibutyltin diacetate being particularly preferred. Likewise, when the cure agent is the preferred chloroplatinic acid complex of divinyltetramethyldisiloxane diluted in dimethylvinylsiloxy endblocked polydimethylsiloxane recited supra, it is advantageously employed so as to provide from about 5 to 500 ppm (parts per million by weight) of platinum metal to the second component, from 20 to 100 ppm being most preferred in such compositions.

As mentioned above, however, the maximum liquid copolymeric organopolysiloxane content in the first component is limited by compatibility considerations and this ingredient must not separate from the PSA matrix to form its own macroscopic phase. It is, of course, recognized that separate phases may exist at a microscopic level.

As will be readily recognized by those skilled in the art, the PSAs of the present invention may be supplied as a solution or dispersion in an inert organic solvent or as a water-borne dispersion. By inert it is meant that the solvent does not react with any of the other ingredients of the present invention. The particular solvent selected will generally depend upon the PSA employed. Thus, for a non-polar PSA such as a silicone or a butyl rubber, a non-polar solvent such as toluene, hexane, cyclohexane, mineral spirits or xylene would be appropriate. For a polar FSA such as a urethane or acrylonitrile, a polar solvent such as acetone, ethyl acetate, tetrahydrofuran or dimethylformamide might be used. When the PSA is supplied as a water-based emulsion, various surfactants are included to maintain a homogeneous dispersion of the liquid and solid ingredients thereof. In general, the PSAs contemplated in the present invention are prepared and marketed in such solvent or water dispersion form and are well known in the art.

Likewise, the liquid copolymeric organopolysiloxane (II) and the cure agent (IV) may be supplied in an organic solvent or as a water-based emulsion for combination with similarly dissolved or dispersed PSA. Again when water-based emulsions of these ingredients are employed surfactants are added to maintain a homogeneous dispersion. Examples of such water-based emulsions of the liquid copolymeric organopolysiloxane (II) and the cure agent (IV) are provided in U.S. Pat. No. 4,423 095, assigned to the assignee of the present invention and hereby incorporated by reference.

Any conventional mixing method may be used to mix the ingredients of the above described components. For example, when the PSA is supplied in solution or emulsion form, relatively low shear mixers such as low speed blade mixers or Pfaudlers may be used. When an all-solids PSA is to be used according to the methods of the present invention, a high intensity mixer, such as a Banbury or roll mill, may be required to insure good dispersion of the ingredients. As far as is known, the order of mixing is not critical to the operability of this invention as long as the liquid copolymeric organopolysiloxane and the cure agent therefor are thoroughly dispersed in the respective PSA composition.

After the above described first and second components are prepared, said components are contacted in the method of this invention to form a pressure-sensitive adhesive construction. Ordinarily, each component is coated onto a substrate before the contacting step is executed. Thus, this well known method in the art can be practiced using the components disclosed herein by first coating a backer, such as a plastic or metallic film or tape, with the first component of this invention and contacting the resulting composite with the surface of a solid substrate such as a metal or plastic, which was previously coated with the second component of the present invention. It is also contemplated that a free film of the first and second components of the present invention may be prepared by coating each component onto a release liner as is commonly practiced in the art in certain bonding operations.

To form such coatings on substrates, solvent-based compositions of this invention can be diluted with a sufficient quantity of a good solvent for the respective components in order to provide a desired coating consistency. As described above, such solvents as hexane, heptane, toluene, xylene, mineral spirits or ketones are suitable for this purpose, the exact choice being based on the nature of the PSAs involved, as is commonly practiced in the art. In the case of water-borne systems, water could be used to adjust the consistency. Coatings of such solvent-based or water-based first and second components may be applied to substrates by any of the methods commonly practiced in the coating arts. For example, they may be dipped, brushed, flow coated, blade coated or gravure coated onto a substrate. After coating the backer or solid substrate with the PSA composition, solvent (or water) is generally removed by evaporation at ambient temperature or by heating, as commonly practiced in the art. Alternatively, 100% solids coatings are also contemplated herein. These may be applied to a substrate by, e.g., a calendaring operation or one of the above mentioned techniques if the viscosity is low enough.

Particularly preferred embodiments of the present invention result when ingredient (II) is a liquid copolymeric organopolysiloxane in which the resinous copolymeric siloxane portion of ingredient (a) consists essentially of $(CH_3)_3SiO_{\frac{1}{2}}$ siloxane units and $SiO_{4/2}$ siloxane units, in the molar ratio of about 0.75:1 and ingredient (b) is $(CH_3)_3SiO[(CH_3)(H)SiO]_bSi(CH_3)_3$ in which b is about 35, the ratio of (a) to (b) being about 1:1 on a solids weight basis.

Those skilled in the art will readily recognize that the constructions of the present invention may be used in many of the applications currently being served by the PSAs described above (i.e., ingredient I of the present invention). With the constructions of the present invention, however, the adhesion is improved and, with the passage of time, the adhesive bond formed between the first and second components will generally increase in strength. This permanent set aspect of the present invention is, of course, an advantage in many applications wherein a strong bond rather than reversibility thereof, is of primary importance. Such applications include bonding of automotive and decorative trim permanent fastening devices such as picture hooks, contact paper and labels, electronic component assembly, substrate lamination (e.g., metals, paper, plastic, floor tiles, carpeting) and the like.

EXAMPLES

The following examples are presented to further illustrate the compositions and methods of this invention, but are not to be construed as limiting the invention, which is delineated in the appended claims. All parts and percentages in the examples are on a weight basis and all are reported on a solids basis unless indicated to the contrary.

The following ingredients were used to prepare the compositions of this invention.

FLUID A—A 70% xylene solution of a siloxane resin copolymer consisting essentially of $(CH_3)_3SiO_{\frac{1}{2}}$ units and $SiO_2$ units in a molar ratio of approximately 0.75:1.

FLUID B—A liquid organohydrogenpolysiloxane having the average formula

wherein Me denotes a methyl radical.

FLUID C—A liquid organopolysiloxane copolymer was prepared according to the methods of U.S. Pat. No. 4,310,678 wherein 59 parts of FLUID A was thoroughly mixed with 41 parts of FLUID B using a nitrogen purge. Xylene solvent was removed as this mixture was heated under a vacuum of about 100 mm Hg at 150° C. for 2 hours to yield a reaction product containing a 1:1 weight ratio of the siloxane resin copolymer to the organohydrogenpolysiloxane.

FLUID D—N-beta-aminoethyl-gamma-aminopropyltrimethoxysilane,

FLUID E—A 10%/90% blend of N-beta-aminoethyl-gammaaminopropyltrimethoxysilane/phenyltrimethoxysilane, FLUID F—A polydimethylsiloxane copolymer having the average structure

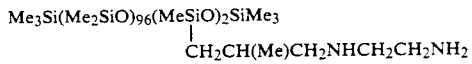

wherein Me denotes a methyl radical.

FLUID G—Diethylenetriamine.

PT—Chloroplatinic acid complex of divinyltetramethyldisiloxane diluted with dimethylvinylsiloxy endblocked polydimethylsiloxane to provide about 0.65 weight percent platinum; prepared according to Example 1 of U.S. Pat. No. 3,419,593 to Willing.

DBTDA—Dibutyltin diacetate.

Examples 1-2

An acrylic pressure-sensitive adhesive (PSA) solution, GELVA MS 263, was modified to form a construction of the present invention. GELVA MS 263 (Monsanto Co., St. Louis, Mo.) is described as a 45% solids solution of an acrylic copolymer in ethyl acetate and hexane. In Example 2, a first component was prepared by thoroughly mixing 9 parts of FLUID C with 100 parts (solids basis) of the PSA. A second component was prepared by thoroughly mixing 5 parts of the DBTDA (tin cure agent) with 100 parts of the pSA (solids basis). Each of these components was then applied to 5 mil aluminum foil, dried to form a 2 mil-thick film thereon and the coated foil was cut into 1 inchwide strips. The foil strips bearing the first and second PSA adhesive films were pressed together at room temperature to form a lap joint having a 1 inch overlap (i.e., a total of 1 square inch contact surface). The same procedure was followed in the preparation of (Comparative) Example 1, which served as a control and contained no additives in either PSA layer. The lap joints were aged at room temperature for various periods and then tested (at room temperature using a pull rate of ½ inch/minute) to determine shear adhesive strength. Results are presented in Table 1, wherein the shear strength is reported in pounds.

TABLE 1

Adhesion of GELVA MS 263 Acrylic PSA (Shear; on 5 mil Aluminum Foil)

| Aging Time at 23° C. (hr) | (Comparative) Example 1 | Example 2 |
|---|---|---|
| 0.02 | 67 (lb.) | 63 (lb.) |
| 0.08 | 78 | 67 |
| 0.17 | 72 | 71 |
| 1.0 | 62 | 78 |
| 24 | 67 | 87* |
| 48 | 51 | 86* |

*indicates that aluminum foil broke—actual strength greater than reported.

Examples 3–4

A styrene-butadiene rubber PSA solution, DURO-TAK 36-6045 (National Starch and Chemical Co., Bridgewater, N.J.), was modified and tested as in Examples 1–2, DURO-TAK 36-6045 is described as a 48% solids solution in toluene, heptane and isopropyl alcohol. In Example 4, a first component, containing 9 parts of FLUID C per 100 parts of the PSA and a second component, containing 5 parts of DBTDA per 100 parts of the PSA, were again coated onto 5 mil aluminum foil, as above, A control SBR PSA construction. (Comparative) Example 3, was prepared in a similar manner, but neither of the components were modified in this case. These constructions were tested for shear adhesive strength as in Examples 1–2. The results, after aging for the indicated times at room temperature, are given in Table 2.

TABLE 2

Adhesion of DURO-TAK 36-6045 Styrene-Butadiene Rubber PSA (Shear; on 5 mil Aluminum Foil)

| Aging Time at 23° C. (hr) | (Comparative) Example 3 | Example 4 |
|---|---|---|
| 0.02 | 72 (lb.) | 17 (lb.) |
| 0.08 | 74 | 48 |
| 0.17 | 59 | 81 |
| 1.0 | 62 | 83 |
| 24 | 61 | 84* |
| 48 | 67 | 79* |

*indicates that aluminum foil broke—actual strength greater than reported.

Examples 1–4 illustrate the improved adhesion, particularly with increasing aging time, of the constructions of the present invention.

Examples 5–6

To illustrate the increase of adhesive strength of the PSA systems of the present invention in a solvent-based silicone PSA, the procedures of Examples 1–2 were followed. The silicone PSA was prepared according to Example 3B of U.S. Pat. No. 4,584,355, cited supra, In these examples, shear adhesion was measured at room temperature after 2 mil thick MYLAR film as well as aluminum panel strips coated with the PSA were pressed together and aged for the times indicated in Table 3. Here, (Comparative) Example 5 served as the control wherein neither layer contained additives.

TABLE 3

Adhesion of Silicone PSA to Itself (180 degree shear)

| | (Comparative) Ex. 5 | Ex. 6 |
|---|---|---|
| Parts of FLUID C in 100 parts of first PSA layer | — | 10 |
| Parts DBTDA in 100 parts of second PSA layer | — | 3 |
| Adhesion (on MYLAR film) after aging: | | |
| (lb)   24 hours | 36 | 42 |
|        48 hours | 37 | 45 |
| Adhesion (on aluminum panel) after aging: | | |
| (lb)   24 hours | 39 | 51 |
|        48 hours | 49 | 69 |

Again, the construction of the present invention showed improved adhesion over the unmodified silicone PSA (Comparative Example 5).

Examples 7–9

The acrylic PSA of Examples 1–2 was modified using FLUID C in the first component and either FLUID E or FLUID F as the cure agent in the second component. The percentages of these ingredients in the two components is indicated in Table 4, wherein (Comparative) Example 7 is included as a control. Shear adhesion results were determined as in the previous examples with the exception that a ten-pound steel roller was used to apply constant pressure to the aluminum foil per ASTM test method D 1000. Results of shear testing are presented in Table 4, wherein the shear values are reported in pounds.

TABLE 4

Adhesion of GELVA MS 263 Acrylic PSA (Shear; on 5 mil Aluminum Foil)

| | (Comparative) Example 7 | Example 8 | Example 9 |
|---|---|---|---|
| % FLUID C in first component (solids basis) | — | 10 | 10 |
| % FLUID E in second component (solids basis) | — | 1.0 | — |
| % FLUID F in second component (solids basis) | — | — | 5.0 |
| Shear Adhesion (lb) | | | |
| After: 1 hour | 52 | 72 | 39 |
|        1 day | 62 | 89* | 39 |
|        2 days | 62 | 80 | 74 |
|        7 days | 60 | 85 | 83* |
|        28 days | 58 | — | 82* |

*indicates that aluminum foil broke; actual strength greater than reported.

Examples 10–13

The styrene-butadiene PSA of Examples 3–4 was modified by using FLUID C in the first component and a cure agent selected from FLUID D, FLUID G or PT in the second component. The percentages of these ingredients in the two components is indicated in Table 5, wherein (Comparative) Example 10 is included as a control. Shear adhesion was determined as in Examples 7–9 using the steel roller, the values being reported in Table 5.

TABLE 5

Adhesion of DURO-TAK 36-6045 Styrene-Butadiene Rubber PSA
(Shear: on 5 mil Aluminum Foil)

| | (Comparative) Example 10 | Ex. 11 | Ex. 12 | Ex. 13 |
|---|---|---|---|---|
| % FLUID C in first component (solids basis) | — | 10 | 10 | 10 |
| % PT in second component (solids basis) | — | 5.0 | — | — |
| % FLUID G in second component (solids basis) | — | — | 5.0 | — |
| % FLUID D in second component (solids basis) | — | — | — | 5.0 |
| Shear Adhesion (lb) | | | | |
| After: 1 hour | 8 | 70 | 60 | 73 |
| 1 day | 8 | 74 | 65 | 75 |
| 2 days | 8 | 65 | 60 | 60 |
| 7 days | 11 | 57 | 74 | 55 |
| 28 days | 10 | — | — | — |

Again, it can be seen from Examples 7-13 that the PSA constructions according to the present invention provide significantly improved adhesive strength over unmodified systems.

We claim:

1. A method for forming a crosslinkable pressure-sensitive adhesive construction comprising: contacting a first component comprising
   (I) a pressure-sensitive adhesive; and
   (II) a liquid copolymeric organopolysiloxane prepared by a method comprising (i) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{\frac{1}{2}}$ units and $SiO_{4/2}$ units wherein the ratio of $R_3SiO_{\frac{1}{2}}$ units to $SiO_{4/2}$ units is 0.6:1 to 0.9:1 and each R denotes, independently a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (ii) heating said homogeneous mixture to remove substantially all of said organic solvent therefrom, with a second component comprising
   (III) said pressure-sensitive adhesive; and
   (IV) a cure agent for said liquid copolymeric organopolysiloxane.

2. The method of claim 1, wherein said pressure-sensitive adhesive is selected from those based on natural, butyl, silicone, acrylic, styrene-butadiene, polyisobutylene, isoprene, isoprene-isobutylene, chloroprene, polyvinylether, chlorinated or polyurethane rubber.

3. The method of claim 1, wherein said R group is methyl and said liquid copolymeric organopolysiloxane is prepared from a homogeneous mixture having an acid number between 0.1 and 1, on a solids basis.

4. The method of claim 3, wherein the ratio of $R_3SiO_{\frac{1}{2}}$ units to $SiO_{4/2}$ units has a value of about 0.75.

5. The method of claim 4, wherein said liquid organohydrogenpolysiloxane is represented by the formula $$Me_3SiO(MeSiO)_b SiMe_3$$
$$\quad\quad\quad\quad H$$

in which Me denotes a methyl radical and b has an average value of 30 to 70.

6. The method of claim 5, wherein equal weights of said resinous copolymeric siloxane and said organohydrogenpolysiloxane are combined to form said liquid copolymeric organopolysiloxane.

7. The method of claim 6, wherein said pressure-sensitive adhesive is selected from those based on styrene-butadiene, acrylic or silicone rubber.

8. The method of claim 1, wherein said cure agent comprises an amine-functional silane having the general formula $$\begin{array}{c} R''''_p \\ | \\ Q{-}Si{-}(X)_{3-p} \end{array}$$

wherein Q is the group $$H_2N{-}\left[R''{-}\underset{H}{N}\right]_n{-}R'''{-}$$

in which R″ represents a divalent hydrocarbon radical having 2 to 4 carbon atoms, R‴ is a divalent hydrocarbon radical having 3 to 6 carbon atoms, R″″ is selected from methyl, ethyl, propyl, butyl or phenyl radicals, X is selected from methoxy, ethoxy, acetoxy or chlorine groups, n is an integer between zero and two, inclusive, and p is zero or one.

9. The method of claim 8 wherein said amine-functional silane comprises at least one silane selected from N-gamma-aminopropyltriethoxysilane or N-beta-aminoethyl-gammaaminopropyltrimethoxysilane.

10. The method of claim 9, wherein said pressure-sensitive adhesive is selected from those based on styrene-butadiene, acrylic, butyl or silicone rubber.

11. The method of claim 10, wherein said cure agent additionally contains up to about 90 weight percent of an organosilane having the general formula $$RSiX_3$$

in which R denotes a monovalent hydrocarbon radical and X is selected from methoxy, ethoxy, acetoxy or chlorine groups.

12. The method of claim 11, wherein said organosilane is phenyltrimethoxysilane.

13. The method of claim 1, wherein said cure agent is an amine-functional silicone having the average general formula $$R_3SiO(R_2SiO)_x(RSiO)_y SiR_3$$
$$\quad\quad\quad\quad\quad\quad\quad Q$$

wherein R denotes a monovalent hydrocarbon radical, x is about 50 to 450 and y is 1 to about 50, in which Q is the group

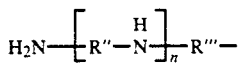

in which R″ represents a divalent hydrocarbon radical having 2 to 4 carbon atoms, R‴ is a divalent hydrocarbon radical having 3 to 6 carbon atoms and n is an integer between zero and two, inclusive.

14. The method of claim 13, wherein R is a methyl radical.

15. The method of claim 14, wherein said pressure-sensitive adhesive is selected from those based on styrene-butadiene, acrylic, or silicone rubber.

16. The method of claim 15, wherein x is about 96, y is 2 and Q is the group represented by the formula

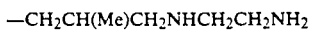

in which Me denotes a methyl radical.

17. The method of claim 1, wherein said cure agent is selected from primary, secondary or tertiary organic amines.

18. The method of claim 17, wherein said organic amine is selected from diethylamine, diethylenetriamine or triethylamine.

19. The method of claim 1, wherein said cure agent is selected from dibutyltin diacetate, dibutyltin dilaurate and stannous octoate.

20. The method of claim 19, wherein said pressure-sensitive adhesive is selected from those based on, styrene-butadiene, acrylic or silicone rubber.

21. The method of claim 1, wherein said cure agent is an active metal catalyst selected from platinum or rhodium compounds.

22. The method of claim 21, wherein said pressure-sensitive adhesive is selected from those based on styrene-butadiene, acrylic or silicone rubber.

23. The method of claim 22, wherein said platinum compound is a chloroplatinic acid complex of divinyltetramethyldisiloxane diluted in dimethylvinylsiloxy endblocked polydimethylsiloxane and containing about 0.65 weight percent of platinum.

24. The method of claim 7, wherein said liquid copolymeric organopolysiloxane is incorporated at about 3 to 10 parts by weight per 100 parts by weight of said pressure-sensitive adhesive and said cure agent is selected from amine-functional silanes, amine-functional siloxanes, organic amines, noble metal compounds or metal salts of carboxylic acids.

25. A composition comprising:
(I) 100 parts by weight of a pressure-sensitive adhesive selected from the group consisting of those based on natural, butyl, acrylic, styrene-butadiene, polyisobutylene, isoprene, isoprene-isobutylene, chloroprene, polyvinylether, chlorinated and polyurethane rubber; and
(II) from about 0.1 to 50 parts by weight of a liquid copolymeric organopolysiloxane prepared by a method comprising (i) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{\frac{1}{2}}$ units and $SiO_{4/2}$ units wherein the ratio of $R_3SiO_{\frac{1}{2}}$ units to $SiO_{4/2}$ units is 0.6:1 to 0.9:1 and each R denotes, independently, a monovalent hydrocarbon radical and (b) a liquid organohydrogenpolysiloxane wherein each organic radical is, independently, a monovalent hydrocarbon radical, there being an average of at least one silicon-bonded hydrogen radical per molecule of said organohydrogenpolysiloxane, and (ii) heating said homogeneous mixture to remove substantially all of said organic solvent therefrom.

26. The composition of claim 25, wherein said R group is methyl and said liquid copolymeric organopolysiloxane is prepared from a homogeneous mixture having an acid number between 0.1 and 1, on a solids basis.

27. The composition of claim 26, wherein said ratio of $R_3SiO_{\frac{1}{2}}$ units to $SiO_{4/2}$ units has a value of about 0.75.

28. The composition of claim 27, wherein said liquid organohydrogenpolysiloxane is represented by the formula

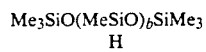

in which Me denotes a methyl radical and b has an average value of 30 to 70.

29. The composition of claim 28, wherein equal weights of said resinous copolymeric siloxane and said organohydrogenpolysiloxane are combined to form said liquid copolymeric organopolysiloxane.

30. The composition of claim 29, wherein said pressure-sensitive adhesive is selected from those based on styrene-butadiene or acrylic rubber.

31. The pressure-sensitive adhesive construction prepared by the method of claim 1.

32. The pressure-sensitive adhesive construction prepared by the method of claim 6.

33. A pressure sensitive adhesive composition formed by contacting a first component comprising (I) an acrylic pressure sensitive adhesive; and (II) a liquid copolymeric organopolysiloxane prepared by a method comprising (i) forming a homogeneous mixture having an acid number greater than zero and consisting essentially of (a) an organic solvent solution of a resinous copolymeric siloxane containing silicon-bonded hydroxyl radicals and consisting essentially of $R_3SiO_{\frac{1}{2}}$ units and $SiO_{4/2}$ units wherein the ratio of $R_3SiO_{\frac{1}{2}}$ units to $SiO_{4/2}$ units is 0.6:1 to 0.9:1 and each R denotes, independently, a monovalent hydrocarbon radical and (b) a liquid organohydrogen polysiloxane wherein each organic radical is, independently, a monovalent hydrocarbon radical, there being an average of at least one silicon-bonded hydrogen radical per molecule of said organohydrogenpolysiloxane, and (ii) heating said homogeneous mixture to remove substantially all of said organic solvent therefrom, with a second component comprising (III) said acrylic pressure sensitive adhesive; and (IV) a curing catalyst for said liquid copolymeric organopolysiloxane.

* * * * *